May 23, 1933.  L. M. CHRISTENSEN  1,911,172
FERMENTATION OF CELLULOSIC MATERIALS
Filed May 25, 1929  2 Sheets-Sheet 1
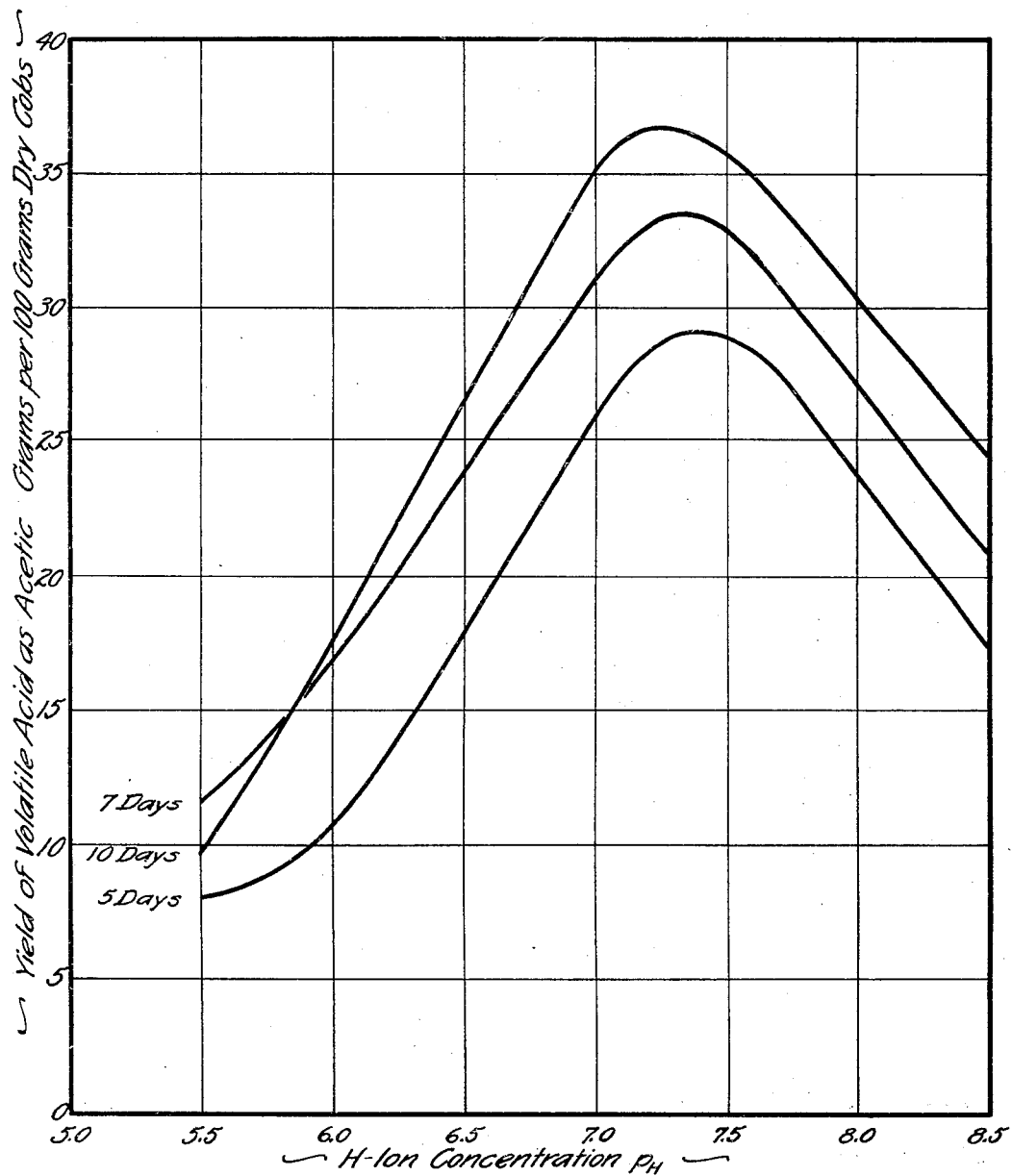
INFLUENCE OF H-ION CONCENTRATION ON THE YIELD OF VOLATILE
ACID FROM CORN COB MEAL - CULTURE No. 5
Leo M. Christensen INVENTOR.
GRAPH I  ATTORNEYS.

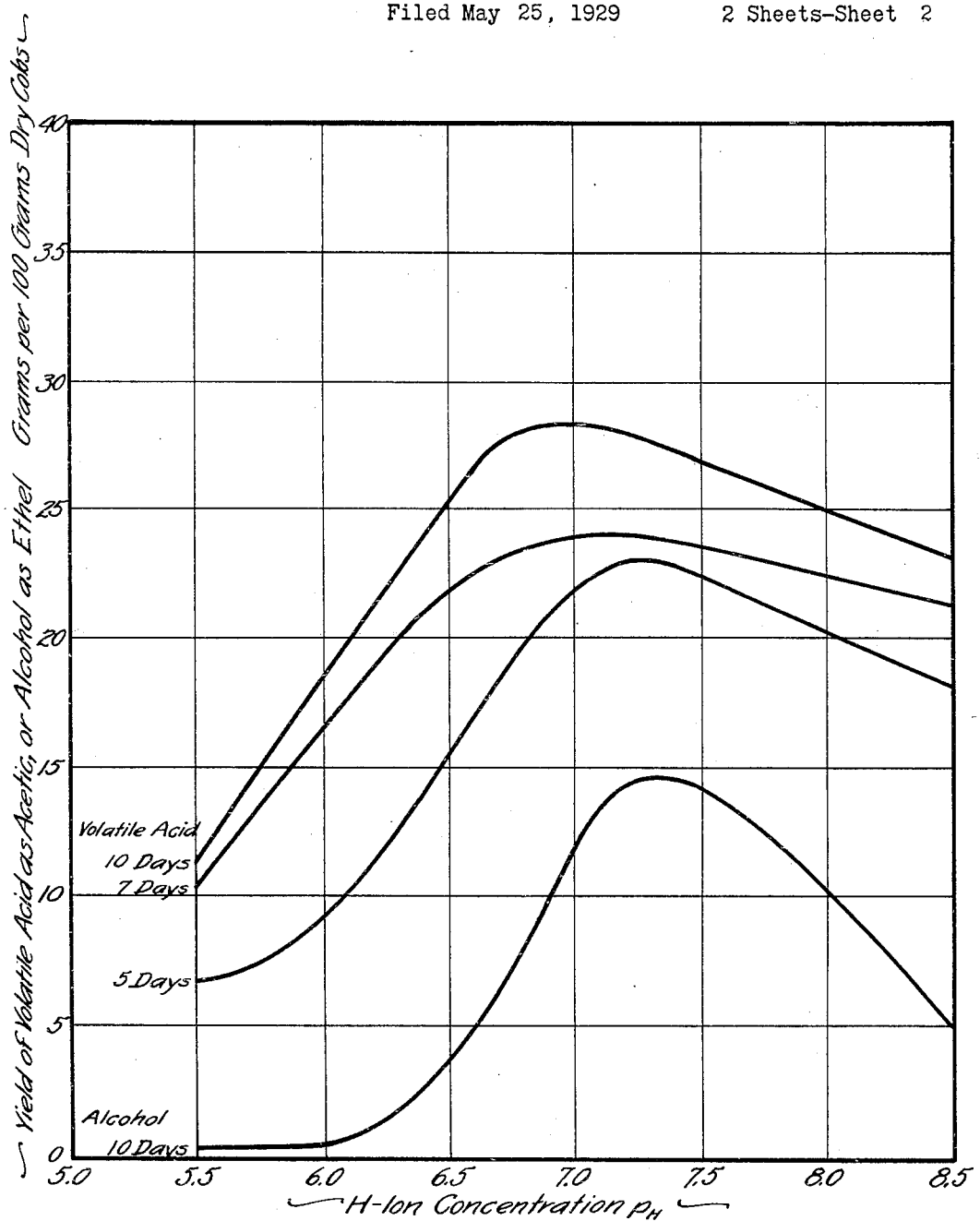
INFLUENCE OF H-ION CONCENTRATION ON THE YIELD OF VOLATILE ACID AND ALCOHOL FROM CORN COB MEAL — CULTURE No. 7
GRAPH II Patented May 23, 1933

1,911,172

UNITED STATES PATENT OFFICE

LEO M. CHRISTENSEN, OF TERRE HAUTE, INDIANA, ASSIGNOR TO COMMERCIAL SOLVENTS CORPORATION, OF TERRE HAUTE, INDIANA, A CORPORATION OF MARYLAND

FERMENTATION OF CELLULOSIC MATERIALS

Application filed May 25, 1929. Serial No. 366,006.

My invention relates to a method of fermenting cellulosic materials for the production of acetic and butyric acids and other useful products. More particularly, my invention relates to the improvement in the process of carrying out such fermentations by carefully regulating the hydrogen ion concentration.

In United States Patents Nos. 1,443,881, 1,602,306, and 1,639,571, Herbert Langwell has described methods of fermenting cellulosic materials by the aid of thermophilic bacteria which produce acetic and butyric acids, ethyl alcohol, and gases such as carbon dioxide, methane, and hydrogen. According to the method described in these patents, a mash is prepared from some comminuted form of cellulosic material such as, for example, corncobs. This mash is then inoculated with a mixture of organisms capable of producing acetic and butyric acids and of the character ordinarily found in almost any form of fermenting vegetable matter, stable manure, pond mud, septic sewage, tank mud, soil, etc. These organisms are usually found in the intestinal tracts of cellulose-consuming animals and accordingly a convenient form of inoculum is obtained by selecting material from the center of a steaming stable-manure heap or from such other source as is most convenient or suitable. The fermentation is then allowed to take place at temperatures in the neighborhood of 60° C.

Like all protoplasmic bodies, bacteria consist of carbon, oxygen, hydrogen, and nitrogen, together with inorganic salts and varying quantities of phosphorus and sulphur. In order that bacteria may develop and multiply, therefore, they must be supplied with these substances in proper quantities and in suitable form for assimilation. The first three materials named are present in the cellulose used as the raw material. Certain of the other required materials are usually present in small but insufficient quantities with the raw material used as the source of the cellulosic material. These necessary nutrients are usually supplied in the form of varying proportions of such materials as potassium sulphate, sodium phosphate, ammonium chloride, ammonium sulphate, potassium chloride, slops from the butyl-acetonic fermentation process, "steep water", etc. Langwell, in the patents cited above, employed only the previously known nutrient materials such as the inorganic salts just mentioned, but did not utilize waste liquors from the fermentation industries, such as the butyl-acetonic slop and "steep water".

It has been found that, in general, bacteria which produce acids during the course of a fermentation become less and less active as the concentration of acid in the medium increases. After a certain point is reached, the action of the bacteria becomes negligible unless the acid is removed from the medium. Such a condition is met with in the present case. Langwell, in the patents cited above, when employing nutrient materials other than fermentation waste liquors, found that the hydrogen ion concentration of the fermenting medium need only be maintained within the relatively broad limits pH 5.0—pH 9.0 measured in the bulk of the mash. As means for regulating the hydrogen ion concentration he recommended the employment (a) of oxides, hydroxides, carbonates, or bicarbonates of alkali metals including ammonium, or (b) oxides, hydroxides, carbonates or bicarbonates of alkaline earth metals including magnesium, in which cases compounds of alkali metals which cause the formation of insoluble alkaline earth metal compounds are added from time to time. It is preferred to follow the procedure outlined under (a) in which case it is necessary to make small additions of the neutralizing agent at intervals thruout the course of the fermentation. Whatever method is resorted to, the mash should be agitated at frequent intervals or at least after each addition of neutralizing agent.

In obtaining the results shown below in Tables I and II, the medium consisted of 6.5% concentration by weight of corncob meal of 30 mesh and finer size, the medium being made up with slops from the butyl-acetonic fermentation process instead of water, as specified in a co-pending application, U. S. Serial No. 150,139, filed November 22, 1926. According to this application, the nutrient materials previously employed in the fermentation of cellulosic materials may be substituted, wholly or in part, by waste liquors or residues from fermentation processes such as those obtained in the production of ethyl alcohol, butyl alcohol, acetone, butyric acid, lactic acid, and the like. When making up the medium in this manner it was not found necessary to add additional nutrients in any other form. Three liters of this medium were placed in a four-liter flask, heated to 60° C. and sufficient sodium bicarbonate or mixtures of soda ash and sodium bicarbonate added to produce the desired hydrogen ion concentration. The flasks of media prepared in this manner were then inoculated with a culture of thermophilic bacteria capable of producing acetic and butyric acids and allowed to ferment at a temperature of 60° C. for a period of ten days, analyses being made at the end of the fifth, seventh and tenth days. During the first three to five days of incubation it was usually found necessary to adjust the hydrogen ion concentration to the desired value twice daily; after that, once daily was sufficient. For reactions more alkaline than pH 7.2, soda ash was added and when it was desired to maintain the reaction at pH 7.2 or more acid, sodium bicarbonate was used. Sodium bicarbonate was used in addition to soda ash for the initial adjustment of the medium to be maintained at pH 7.4 to pH 8.5 because of the good buffering produced by the bicarbonate.

Results tabulated below were obtained with two slightly different cultures, the principal difference between them being that No. 7, in addition to volatile acids such as acetic and butyric, forms considerable amounts of ethyl alcohol, whereas culture No. 5, gives little, if any, of the latter material. As will be seen from an examination of Table II, however, the maximum yields of ethyl alcohol are produced by culture No. 7 at approximately the hydrogen ion concentration found to be optimum for the production of volatile acids.

Table I.—Culture No. 5

| H-ion concentration pH | Soda bicarbonate or soda ash added during fermentation G/100 cc. | | | Volatile acid, as acetic G/100 G dry cobs | | |
|---|---|---|---|---|---|---|
| | 5 day | 7 day | 10 day | 5 day | 7 day | 10 day |
| 5.5 | 0.12 | 0.15 | 0.22 | 8.1 | 11.7 | 9.6 |
| 6.0 | 0.40 | 0.60 | 0.80 | 10.5 | 16.8 | 17.8 |
| 6.5 | 1.40 | 1.83 | 2.00 | 18.6 | 25.0 | 27.8 |
| 6.8 | 1.80 | 2.43 | 2.53 | 24.9 | 30.2 | 31.8 |
| 7.0 | 2.03 | 2.10 | 2.47 | 25.8 | 30.7 | 33.6 |
| 7.2 | 2.23 | 2.33 | 2.57 | 26.0 | 31.2 | 36.1 |
| 7.4 | 1.67 | 1.70 | 2.03 | 29.0 | 33.2 | 37.4 |
| 7.6 | 0.83 | 0.96 | 1.10 | 23.4 | 27.2 | 29.4 |
| 7.8 | 1.27 | 1.37 | 1.37 | 28.3 | 31.2 | 31.8 |
| 8.0 | 1.13 | 1.13 | 1.13 | 21.4 | 25.1 | 30.4 |
| 8.5 | 1.17 | 1.17 | 1.17 | 18.8 | 20.6 | 24.4 |

Table II.—Culture No. 7

| H-ion concentration pH | Soda bicarbonate or soda ash added during fermentation G/100 cc. | | | Volatile acid as acetic G/100 G dry cobs | | | Alcohol as ethyl G/100 G dry cobs |
|---|---|---|---|---|---|---|---|
| | 5 day | 7 day | 10 day | 5 day | 7 day | 10 day | 10 day |
| 5.5 | 0.23 | 0.30 | 0.37 | 6.8 | 10.1 | 11.4 | 0.26 |
| 6.0 | 0.40 | 0.47 | 0.57 | 9.2 | 17.2 | 18.7 | 0.26 |
| 6.5 | 1.33 | 1.63 | 1.93 | 17.9 | 22.7 | 25.2 | 4.68 |
| 6.8 | 1.44 | 1.56 | 1.75 | 18.3 | 22.8 | 28.8 | 7.50 |
| 7.0 | 1.83 | 1.73 | 1.90 | 21.9 | 23.1 | 28.0 | 12.51 |
| 7.2 | 1.97 | 1.97 | 1.97 | 22.8 | 24.3 | 28.4 | 14.80 |
| 7.4 | 0.70 | 0.70 | 0.70 | 22.2 | 22.9 | 24.8 | 12.25 |
| 7.6 | 0.80 | 0.83 | 0.83 | 22.1 | 23.4 | 25.0 | 13.48 |
| 7.8 | 0.90 | 1.00 | 1.00 | 21.4 | 24.6 | 26.2 | 13.35 |
| 8.0 | 1.03 | 1.10 | 1.10 | 19.1 | 22.2 | 25.2 | 0.95 |
| 8.5 | 1.50 | 1.50 | 1.50 | 18.9 | 21.1 | 23.5 | 4.91 |

Although, as was stated above, Langwell found that a wide range of pH could be utilized when employing inorganic nutrients, it may readily be seen from the above tables that the discovery has now been made that when a fermentation waste liquor is employed as the nutrient material, much narrower limits of pH are necessary. Although the limits may vary slightly with different organisms, different concentrations of mash, etc., it may be seen that when nutrients of this character are employed, the limits are preferably from pH 6.7 to pH 8.0, the optimum point being about pH 7.3. Thus, from the above data and from the attached graphs it may be seen that with culture No. 5 optimum yields are obtained for either a 5, 7 or 10 day fermentation when the hydrogen ion concentration is maintained within the narrow limits of pH 7.2 and pH 7.4, while satisfactory results are obtained if the acidity is maintained within the somewhat broader limits of pH 6.7 to pH 8.0. In the case of culture No. 7, however, slightly different conditions are necessary for optimum yields at different periods of time. Likewise, optimum yields of alcohol are obtained only when a hydrogen ion concentration slightly different from that found to be optimum for acid production is employed.

Now having described my invention, what I claim as new and novel is:

1. In a process for the fermentation of a cellulosic mash in which the source of cellulose comprises unrefined natural cellulosic materials and in which the nutrients comprise at least in part nitrogen-containing waste liquors from fermentation industries, the improvement which comprises subjecting the said mash to the action of bacteria capable of fermenting cellulose while maintaining the acidity of the mash so that the hydrogen ion concentration is maintained within the limits pH 6.7 and pH 8.0 measured in the bulk of the mash.

2. In a process for the fermentation of a cellulosic mash in which the source of cellulose comprises unrefined natural cellulosic materials and in which the nutrients comprise at least in part nitrogen-containing waste liquors from fermentation industries, the improvement which comprises subjecting the said mash to the action of bacteria capable of fermenting cellulose while maintaining the acidity of the mash at approximately pH 7.3 measured in the bulk of the mash.

3. In a process for the fermentation of a cellulosic mash in which the source of cellulose comprises unrefined natural cellulosic materials and in which the nutrients comprise at least in part nitrogen-containing waste liquors from fermentation industries, the improvement which comprises subjecting the said mash to the action of thermophilic bacteria capable of fermenting cellulose while controlling the acidity of the mash by the employment of alkaline compounds of the alkali metals (including ammonium) so that the hydrogen ion concentration is maintained within the limits pH 6.7 and pH 8.0 measured in the bulk of the mash.

4. In a process for the fermentation of a cellulosic mash in which the source of cellulose comprises unrefined natural cellulosic materials and in which the nutrients comprise at least in part nitrogen-containing waste liquors from fermentation industries, the improvement which comprises subjecting the said mash to the action of thermophilic bacteria capable of fermenting cellulose while controlling the acidity of the mash by the employment of alkaline compounds of the alkali metals (including ammonium) so that the hydrogen ion concentration is maintained at approximately pH 7.3 measured in the bulk of the mash.

5. In a process for the fermentation of a cellulosic mash in which the source of cellulose comprises comminuted corncobs and in which the nutrients comprise at least in part butyl-acetonic slop, the improvement which comprises subjecting the said mash to the action of bacteria capable of fermenting cellulose while maintaining the acidity of the mash so that the hydrogen ion concentration is maintained within the limits pH 6.7 and pH 8.0 measured in the bulk of the mash.

6. In a process for the fermentation of a cellulosic mash in which the source of cellulose comprises comminuted corncobs and in which the nutrients comprise at least in part butyl-acetonic slop, the improvement which comprises subjecting the said mash to the action of bacteria capable of fermenting cellulose while maintaining the acidity of the mash at approximately pH 7.3 measured in the bulk of the mash.

7. In a process for the fermentation of a cellulosic mash in which the source of cellulose comprises comminuted corncobs and in which the nutrients comprise at least in part butyl-acetonic slop, the improvement which comprises subjecting the said mash to the action of thermophilic bacteria capable of fermenting cellulose while controlling the acidity of the mash by the employment of alkaline compounds of the alkali metals (including ammonium) so that the hydrogen ion concentration is maintained with the limits pH 6.7 and pH 8.0 measured in the bulk of the mash.

8. In a process for the fermentation of a cellulosic mash in which the source of cellulose comprises comminuted corncobs and in which the nutrients comprise at least in part butyl-acetonic slop, the improvement which comprises subjecting the said mash to the action of thermophilic bacteria capable of fermenting cellulose while controlling the acidity of the mash by the employment of alkaline compounds of the alkali metals (including ammonium) so that the hydrogen ion concentration is maintained at approximately pH 7.3 measured in the bulk of the mash.

In testimony whereof I affix my signature.

LEO M. CHRISTENSEN.

CERTIFICATE OF CORRECTION.

Patent No. 1,911,172.  May 23, 1933.

LEO M. CHRISTENSEN.

It is hereby certified that error appears in the printed specification of the above numbered patent requiring correction as follows: Page 1, line 94, after "II" insert the words "and Graphs 1 and 2"; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.